United States Patent
Fukuyama et al.

(12)

(10) Patent No.: US 10,754,231 B2
(45) Date of Patent: Aug. 25, 2020

(54) PROJECTOR

(71) Applicant: SEIKO EPSON CORPORATION, Tokyo (JP)

(72) Inventors: Takanori Fukuyama, Matsumoto (JP); Koji Shiokawa, Azumino (JP); Nobuyuki Otsuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/110,584

(22) Filed: Aug. 23, 2018

(65) Prior Publication Data
US 2019/0064641 A1    Feb. 28, 2019

(30) Foreign Application Priority Data

Aug. 24, 2017   (JP) ................................. 2017-160897

(51) Int. Cl.
| | |
|---|---|
| *G03B 21/14* | (2006.01) |
| *G03B 21/20* | (2006.01) |
| *G03B 33/12* | (2006.01) |

(52) U.S. Cl.
CPC ....... *G03B 21/145* (2013.01); *G03B 21/2086* (2013.01); *G03B 21/208* (2013.01); *G03B 33/12* (2013.01)

(58) Field of Classification Search
CPC ............. G03B 21/145; G03B 21/2086; G03B 21/208; G03B 33/12
See application file for complete search history.

(56) References Cited

U.S. PATENT DOCUMENTS

| | | | |
|---|---|---|---|
| 8,537,288 B2 | 9/2013 | Hayashi et al. | |
| 8,752,968 B2 | 6/2014 | Saito et al. | |
| 8,879,007 B2 | 11/2014 | Hayashi et al. | |
| 2010/0265419 A1 | 10/2010 | Hayashi et al. | |
| 2012/0242966 A1* | 9/2012 | Saito .................... | G03B 21/142 353/100 |
| 2013/0300951 A1 | 11/2013 | Hayashi et al. | |
| 2016/0018722 A1* | 1/2016 | Enokishima ......... | G03B 21/145 353/30 |

FOREIGN PATENT DOCUMENTS

| | | |
|---|---|---|
| JP | 2007-121554 A | 5/2007 |
| JP | 2010-256394 A | 11/2010 |
| JP | 2012-198463 A | 10/2012 |
| JP | 2013-109058 A | 6/2013 |

* cited by examiner

*Primary Examiner* — Michelle M Iacoletti
*Assistant Examiner* — Danell L Owens
(74) *Attorney, Agent, or Firm* — Oliff PLC

(57) ABSTRACT

In a projector, a first fixation section and a second fixation section are formed at two places located at a distance in an optical axis direction in a lens barrel of a projection optical system. A holding member has contact with the first fixation section from an optical axis direction-rear side, and is fixed, an optical component housing of an illumination light guide optical system has contact with the holding member from the optical axis direction-rear side, and is fixed. A light modulating/combining optical system for generating image light has contact with the second fixation section from the optical axis direction-rear side and is fixed. In other words, the light modulating/combining optical system is directly fixed to the lens barrel without the intervention of the holding member for fixing the illumination light guide optical system to the lens barrel.

14 Claims, 6 Drawing Sheets

PROJECTOR

BACKGROUND

1. Technical Field

The present invention relates to a projector for projecting an image or the like using a projection optical system.

2. Related Art

In the past, there has been known a projector for projecting image light generated using light from a light source on a screen in an enlarged manner using a projection optical system. In JP-A-2012-198463 (Document 1), there is disclosed a projector of this kind in the projector of Document 1, an optical system (an optical unit) a cooling fan, a control device, a power supply device and so on are housed in an exterior housing. The projector of Document 1 is provided with an illumination light guide optical system (an optical engine) for generating R light G right, and B light using the light from the light source, a light modulating/combining optical system (an optical device) provided with light modulation devices for generating the image light from the light, the G light, and the B light, and the projection optical system for projecting the image light in an enlarged manner. The illumination light guide optical system (the optical engine) is installed in an optical component housing, and is fixed to the exterior housing via the optical component housing. Further, the projection optical system and the light modulating/combining optical system (the optical device) are installed in a holding member, and fixed to the optical component housing via the holding member.

In Document 1, an end part on the rear side (incident side) in the optical axis direction of a lens barrel for holding a lens of the projection optical system is disposed inside the holding member, and one end of the holding member is fixed to a flange provided to a roughly central part in the optical axis direction of the lens barrel. The other end of the holding member extends to an end part on the incident side of the lens barrel. Therefore, by fixing the light modulating/combining optical system to the other end of the holding member, the light modulating/combining optical system is disposed on the incident side of the projection optical system. Further, the holding member is provided with protrusions for fixing the optical component housing formed in the vicinity of the end part to which the light modulating/combining optical system is fixed.

As described above, in Document 1, positioning of the light modulating/combining optical system to the projection optical system is achieved via the holding member to be fixed to the flange of the lens barrel. However, since the optical component housing is also fixed to the holding member, if the optical component housing is deformed when installing the light source or the optical system to the optical component housing, a position shift or a deformation are also caused in the holding member in consequence of the deformation of the optical component housing, and as a result, the position accuracy of the light modulating/combining optical system deteriorates. Further, there is a possibility that the position shift and the deformation also occur in the holding member cause the position accuracy of the light modulating/combining optical system to deteriorate due to an impact to the projector or dropping. In particular, in the projection optical system using a short focus lens, the weight of the lens is heavy, and therefore, the influence of an impact such as dropping is significant.

Further, in Document 1, the holding member extends in the optical axis direction, the end part on the front side (the emission side) in the optical axis direction of the holding member is fixed to the projection optical system, and the light modulating/combining optical system is fixed to the end part on the rear side (the incident side) in the optical axis direction of the holding member. In the structure of fixing the light modulating/combining optical system via the holding member extending in the optical axis direction as described above, the displacement of the fixation position of the light modulating/combining optical system is large in the case in which the holding member thermally expands due to rise in inside temperature of the projector to cause the position accuracy of the light modulating/combining optical system with respect to the projection optical system to deteriorate. Therefore, with respect to the structure of Document 1, there is a possibility of the degradation of the temperature drift characteristics.

SUMMARY

An advantage of some aspects of the invention is to prevent the degradation of the position accuracy of a light modulating/combining optical system with respect to a projection optical system in the case of forming an optical unit by assembling the projection optical system, the light modulating/combining optical system for generating an image light, and an illumination light guide optical system.

A projector according to an aspect of the invention includes an illumination light guide optical system provided with a light source, an optical system, and an optical component housing adapted to hold the light source and the optical system, a light modulating/combining optical system adapted to modulate light entering the light modulating/combining optical system from the illumination light guide optical system to generate image light beam, a projection optical system adapted to project the image light entering the projection optical system from the light modulating/combining optical system, a holding member to which the optical component housing is fixed, and an exterior housing adapted to house the illumination light guide optical system, the light modulating/combining optical system, the projection optical system, and the holding member, wherein the projection optical system is provided with a lens and a lens barrel adapted to hold the lens, and the lens barrel is provided with a first fixation section to which the holding member is fixed, and a second fixation section to which the light modulating/combining optical system is fixed, the first fixation section and the second fixation section being disposed at different positions.

A projector according to another aspect of the invention includes an illumination light guide optical system provided with a light source, an optical system, and an optical component housing adapted to hold the light source and the optical system, a light modulating/combining optical system adapted to modulate light entering the light modulating/combining optical system from the illumination light guide optical system to generate image light beam, a projection optical system adapted to project the image light entering the projection optical system from the light modulating/combining optical system, and an exterior housing adapted to house the illumination light guide optical system, the light modulating/combining optical system, and the projection optical system, wherein the projection optical system is provided with a lens and a lens barrel adapted to hold the lens, and the lens barrel is provided with a first fixation section to which the optical component housing is fixed, and a second fixation section to which the light modulating/combining optical system is fixed, the first fixation section and the second fixation section being disposed at different positions.

According to these aspects of the invention, the lens barrel of the projection optical system is provided with the second fixation section to which the light modulating/combining optical system is fixed, and the second fixation section is a different region from the first fixation section where the housing of the illumination light guide optical system is fixed to the lens barrel directly or via the holding member. Since the second fixation section is disposed separately from the first fixation section as described above, the light modulating/combining optical system is not affected by the position shift or the deformation of the members due to the fixation of the illumination light guide optical system. Therefore, the possibility that the position accuracy of the light modulating/combining optical system is deteriorated is low. Further, the light modulating/combining optical system is fixed to the second fixation section provided to the lens barrel, and no other member intervenes between the light modulating/combining optical system and the lens barrel. Therefore, it is possible to prevent the deterioration of the position accuracy of the light modulating/combining optical system due to an impact or the like.

The aspect of the invention may be configured such that, in the case in which the holding member is fixed to the first fixation section, and the optical component housing is fixed to the first fixation section via the holding member, the first fixation section is a first flange protruding outward in a radial direction from the lens barrel, and the holding member is provided with a lens barrel fixation section which has contact with the first flange from an optical axis direction-rear side, and is fixed to the first flange, an illumination light guide optical system fixation section to which the optical component housing is fixed, and an exterior housing fixation section to be fixed to the exterior housing. According to this configuration, it is possible to position in the optical axis direction and then fix the holding member to the lens barrel. Therefore, it is possible to position in the optical axis direction and then fix the optical component housing to the lens barrel via the holding member.

The aspect of the invention may be configured such that, in the case in which the optical component housing is directly fixed to the first fixation section, the first fixation section is a first flange protruding outward in a radial direction from the lens barrel, and the optical component housing is provided with a lens barrel fixation section which has contact with the first flange from an optical axis direction-rear side, and is fixed to the first flange, and an exterior housing fixation section to be fixed to the exterior housing. According to this configuration, it is possible to position in the optical axis direction and then fix the optical component housing to the lens barrel.

In the aspect of the invention, it is preferable that the first fixation section and the second fixation section are disposed at respective positions different in a direction parallel to an optical axis of the projection optical system from each other. According to this configuration, it is possible to fix the light modulating/combining optical system and the illumination light guide optical system at appropriate positions with respect to the lens barrel of the projection optical system.

In the aspect of the invention, it is preferable that the second fixation section is disposed in an end part on the optical axis direction-rear side of the lens barrel. According to this configuration, in the light modulating/combining optical system, it is possible to shorten the length in the optical axis direction of the region to be fixed to the second fixation section. Therefore, the possibility that the position accuracy of the light modulating combining optical system is deteriorated due to the thermal expansion is low. Therefore, the deterioration of the temperature drift characteristics can be prevented.

In the aspect of the invention, it is preferable that the first fixation section is disposed at a position closer to an end part on the optical axis direction-front side than to an end part on the optical axis direction-rear side of the lens barrel, and it is more desirable that in the optical axis direction, the position of the first fixation section coincides with the centroid of the projection optical system. According to this configuration, since the first fixation section is disposed at the position coinciding with the centroid of the projection optical system or a position close to the centroid, it is possible to support the projection optical system at the position close to the centroid, and it is possible to support the projection optical system in a balanced manner. Further, by supporting the projection optical system at a position close to the centroid, the position shift and the deformation of the projection optical system due to an impact can be prevented.

BRIEF DESCRIPTION OF THE DRAWINGS

The invention will be described with reference to the accompanying drawings, wherein like numbers reference like elements.

DESCRIPTION OF AN EXEMPLARY EMBODIMENT

An embodiment of a projector to which the invention is applied will hereinafter be described with reference to the accompanying drawings.

Overall Configuration

Figure 1:
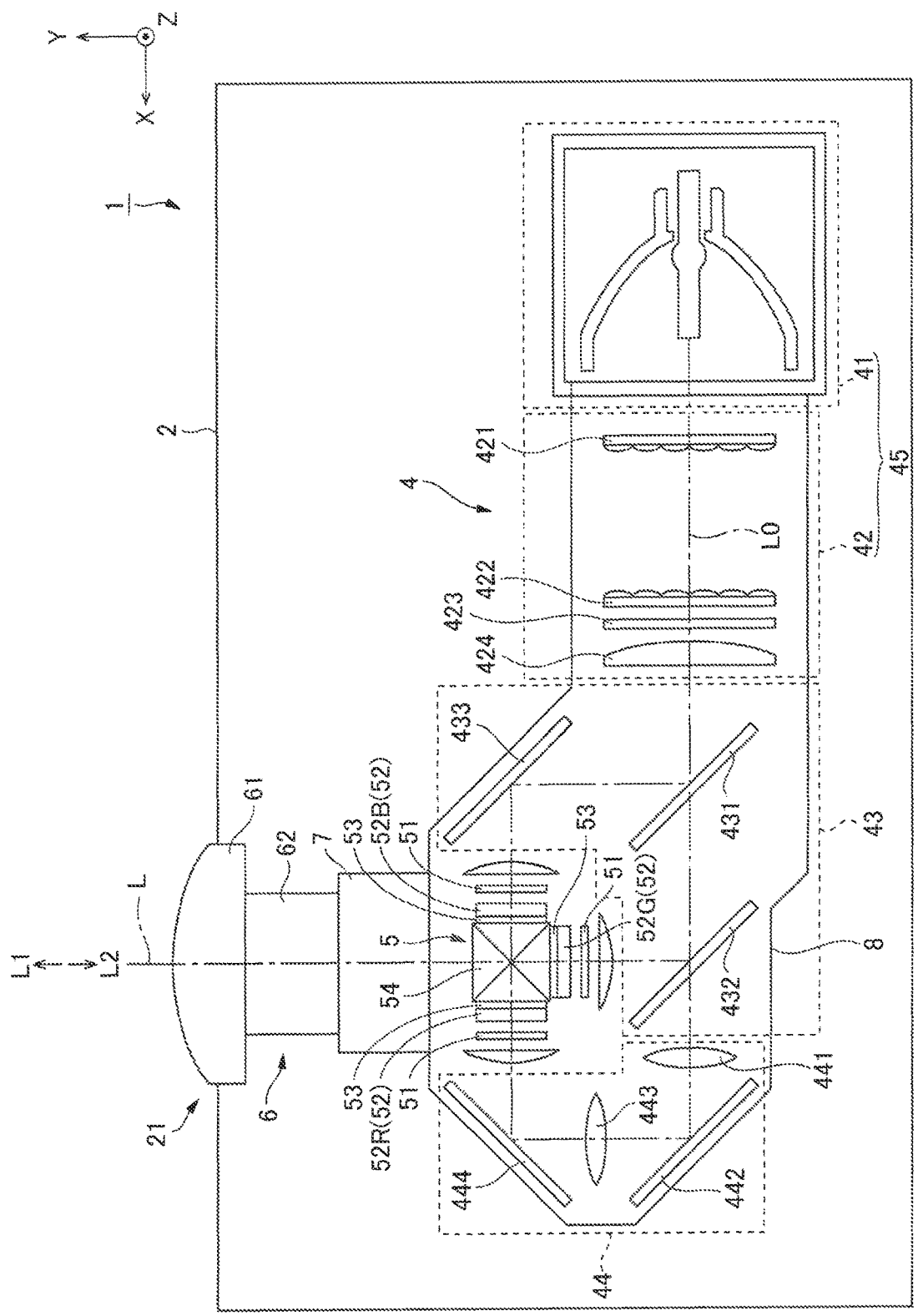
FIG. 1 is a schematic configuration diagram of a projector to which the invention is applied.
Figure 2:
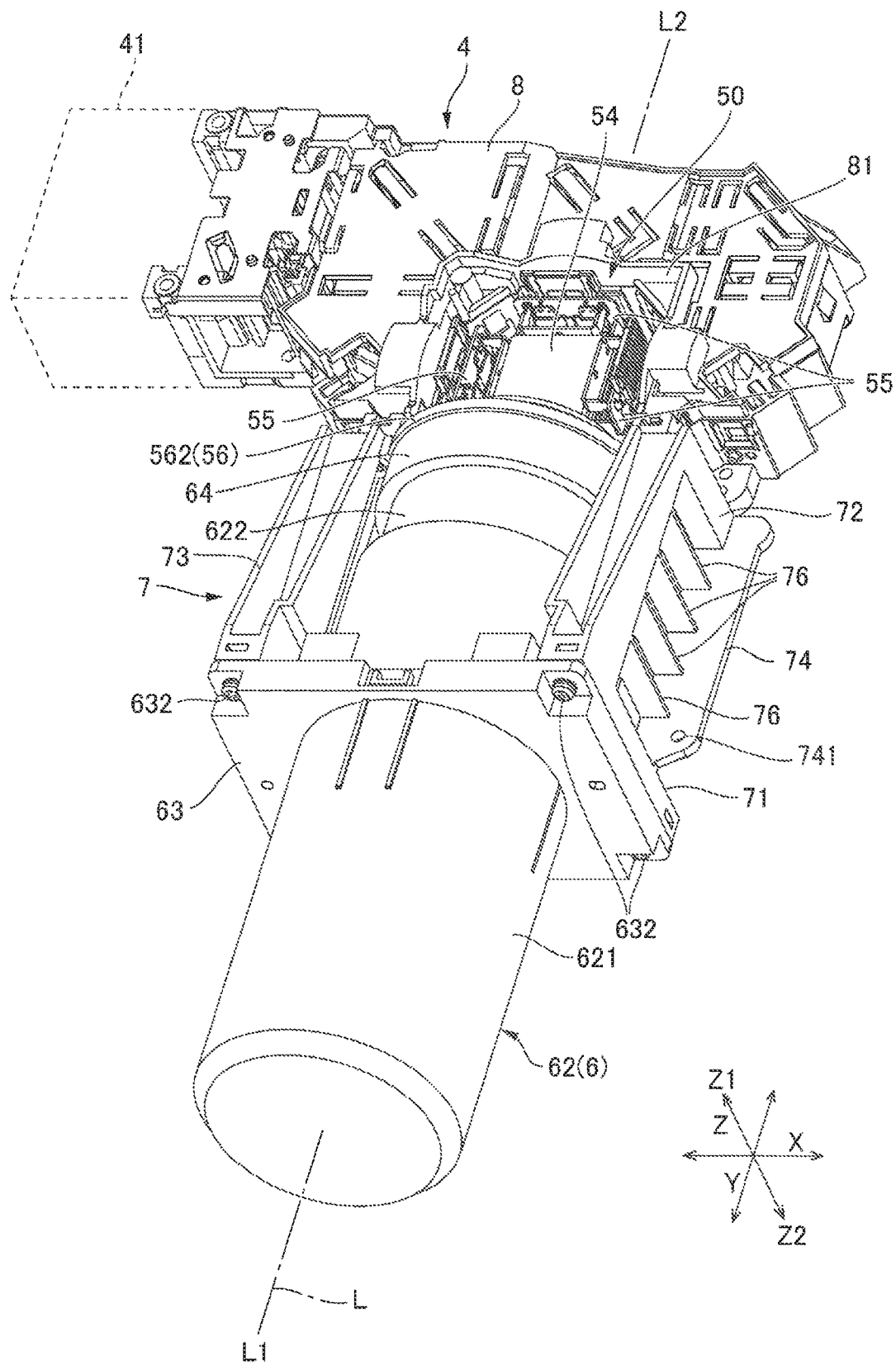
FIG. 2 is an external perspective view of a principal part of the projector shown in FIG. 1.
Figure 3:
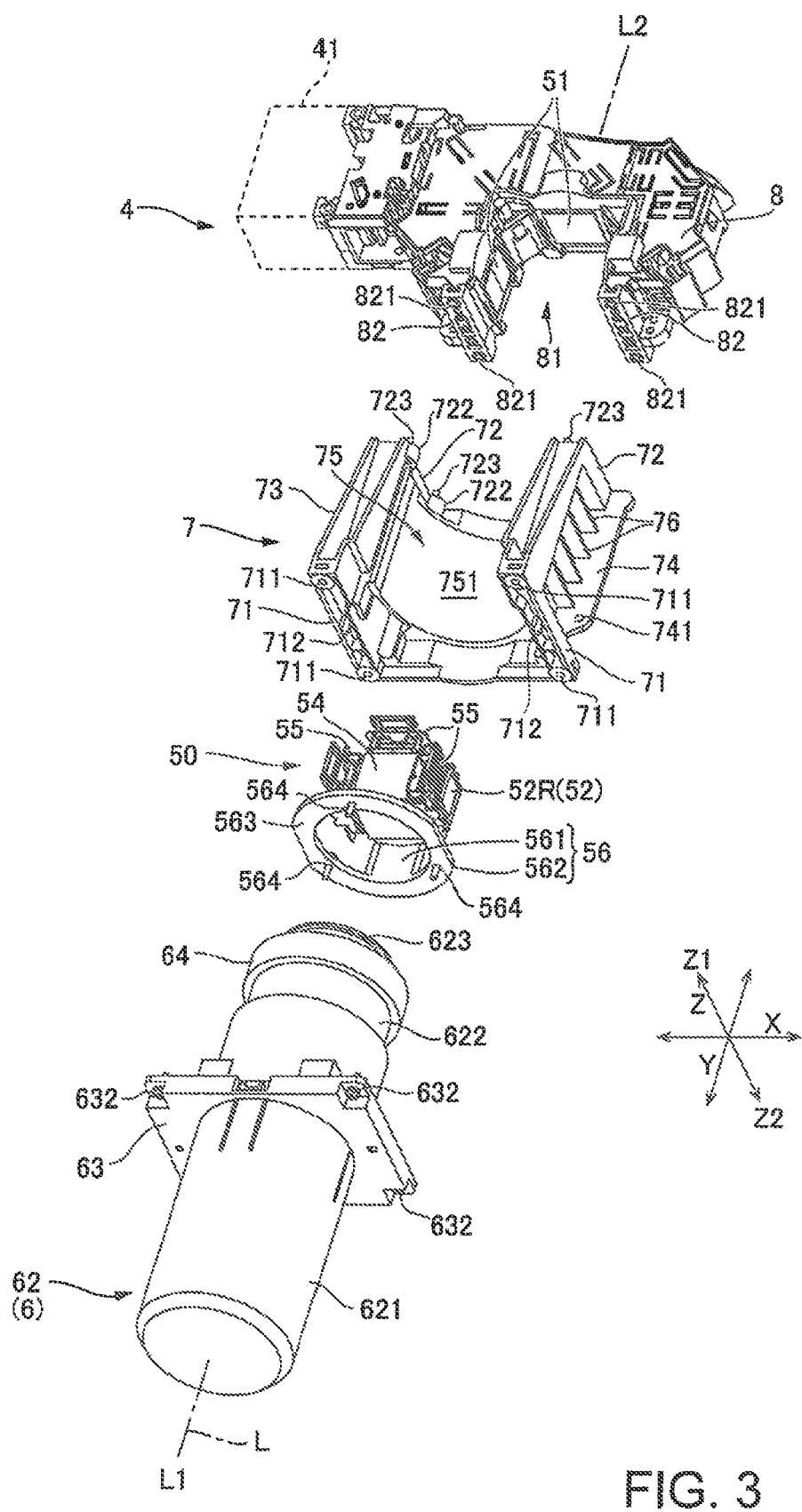
FIG. 3 is an exploded perspective view of the principal part of the projector shown in FIG. 1 viewed from obliquely above the front side in an optical axis direction.
Figure 4:
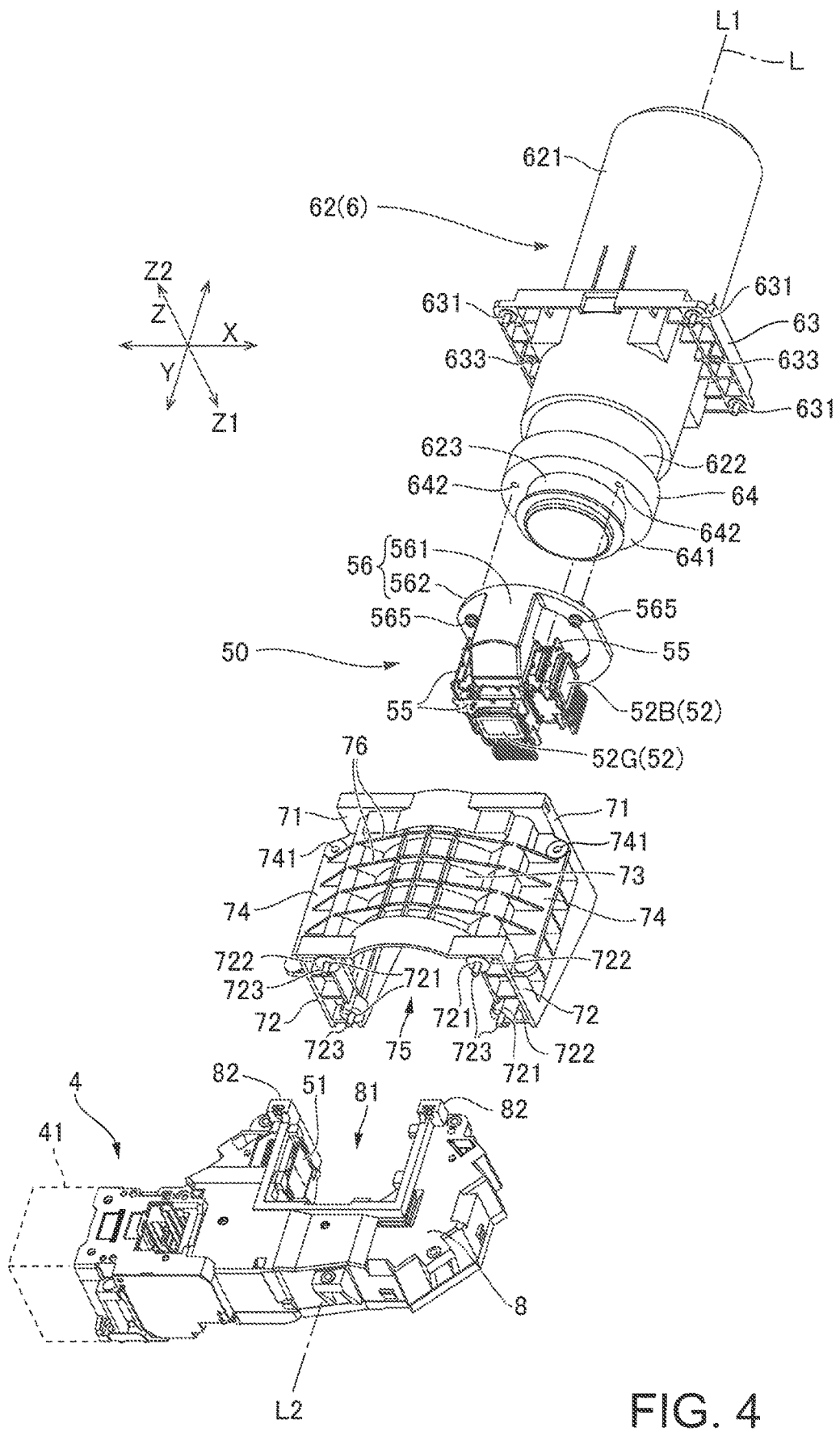
FIG. 4 is an exploded perspective view of the principal part of the projector shown in FIG. 1 viewed from obliquely below the rear side in the optical axis direction.

FIG. 1 is a schematic configuration diagram of the projector to which the invention is applied, and FIG. 2 is an external perspective view of a principal part of the projector shown in FIG. 1. Further, FIG. 3 and FIG. 4 are exploded perspective views of the principal part of the projector shown in FIG. 1, wherein FIG. 3 is an exploded perspective view viewed from obliquely above the front side in an optical axis direction, and FIG. 4 is an exploded perspective view viewed from obliquely below the rear side in the optical axis direction. As shown in FIG. 1, the projector 1 is provided with an exterior housing 2 and an optical system housed in the exterior housing 2. Further, although not shown in FIG. 1, constituents for cooling the inside of the projector 1 such as a fan and a duct for guiding air, a control section, a power supply device and so on are disposed inside the exterior housing 2 in addition to the optical system.

The projector 1 is provided with an illumination light guide optical system 4, an image light generation section 5, a projection optical system 6, and a holding member 7. In the present embodiment, the illumination light guide optical system 4 and the projection optical system 6 are connected to each other via the holding member 7. Further, the image light generation section 5 is fixed to the projection optical system 6 except some members. The illumination light guide optical system 4, the image light generation section 5, and the projection optical system 6 are disposed in a shape bending at a right angle in a planar view.

Further, in the present specification, three directions perpendicular to each other are defined as an X direction, a Y direction, and a Z direction, respectively. Further, an optical axis direction of the projection optical system 6 is defined as L, among one side and the other side in the optical axis direction L, the side (emission side) on which light is emitted from the projection optical system 6 is defined as an optical axis direction-front side L1, and the side (incident side) on which light enters the projection optical system 6 is defined as an optical axis direction-rear side 12. In the present embodiment, the optical axis direction L is parallel to the Y direction. Further, the Z direction is a direction parallel to the vertical direction in the case of installing the projector 1 in a normal installation state. Therefore, one side in the Z direction is defined as an upper side Z1, and the other side is defined as a lower side Z2.

As shown in FIG. 1, the image light generation section 5 is disposed so that the optical axis direction-rear side 12 and both sides in the X direction are surrounded by the illumination light guide optical system 4, and the projection optical system 6 is disposed on the optical axis direction-front side L1 of the image light generation section 5. A front side lens 61 provided to an end part on the optical axis direction-front side L1 of the projection optical system 6 faces a projecting opening part 21 provided to a front end surface of the exterior housing 2. The light emitted from the projection optical system 6 is projected toward the front of the projector 1 from the projecting opening part 21. The projection optical system 6 is configured using a short focus lens.

Illumination Light Guide Optical System

As shown in FIG. 1, the illumination light guide optical system 4 is provided with an illumination device 45 provided with a light source device 41 and a homogenizing optical system 42, a color separation optical system 43 and a relay optical system 44. Further, the illumination light guide optical system 4 is provided with an optical component housing 8 for holding the light source device 41 and the optical systems described above in the state of being disposed at predetermined positions on a light path L0. The light source device 41 is disposed in an end part on one side in the X direction of the illumination light guide optical system 4. Further, in a part on the other side in the X direction of the illumination light guide optical system 4, there are disposed the color separation optical system 43 and the relay optical system 44 so as to surround the optical axis direction-rear side L2 and both sides in the X direction of the image light generation section 5.

In the illumination device 45, the light source device 41 is provided with a discharge type light source such as a super high-pressure mercury lamp or a metal halide lamp, and collimates a light beam emitted from the light source, and then emits the light beam toward the homogenizing optical system 42. The homogenizing optical system 42 is provided with a first lens array 421, a second lens array 422, a polarization conversion element 423, and a superimposing lens 424. The homogenizing optical system 42 superimposes the light beam from the light source device 41 on an irradiation target surface (a liquid crystal panel 52 described later). The color separation optical system 43 is provided with two dichroic mirrors 431, 432, and a reflecting mirror 433, and separates the light beam emitted from the homogenizing optical system 42 into three colors of colored light beams, namely a red light beam (hereinafter referred to as a "R light beam"), a green light beam (hereinafter referred to as a "G light beam"), and a blue light beam (hereinafter referred to as a "B light beam").

The relay optical system 44 is provided with an incident side lens 441, a relay lens 443, and reflecting mirrors 442, 444. In the present embodiment, the relay optical system 44 guides the R light beam separated by the color separation optical system 43 to a liquid crystal panel 52R for the R light beam described later. It should be noted that it is also possible to adopt a configuration in which the relay optical system 44 guides the B light beam instead of the R light beam.

As shown in FIG. 3 and FIG. 4, in a part on an opposite side to the side on which the light source device 41 is disposed in the optical component housing 8, there is formed a recessed part 81 recessed toward the optical axis direction-rear side L2 to form a rectangular shape. In the recessed part 81, there is disposed the image light generation section 5. Further, on both sides in the X direction of the recessed part 81, there are formed a pair of wall parts 82 protruding toward the optical axis direction-front side L1. On an end surface on the optical axis direction-front side L1 of each of the pair of wall parts 82, there are disposed two fixation holes 821. As described later, fixation screws 723 for fixing the holding member 7 to the optical component housing 8 are screwed into the respective fixation holes 821.

Image Light Generation Section

The image light generation section 5 modulates the colored light beams (the R light beam, the G light beam, and the B light beam) generated by the illumination light guide optical system 4 in accordance with image information, and then combines the colored light beams thus modulated with each other. The image light generation section 5 is provided with incident side polarization plates 51, liquid crystal panels 52 as light modulation devices, emission side polarization plates 53, and a cross dichroic prism 54. The incident side polarization plate 51, the liquid crystal panel 52 and the emission side polarization plate 53 are provided to each of the three colors of colored light beams. The liquid crystal panel for the R light beam is denoted by 52R, the liquid crystal panel for the G light beam is denoted by 52G, and the liquid crystal panel for the B light beam is denoted by 52B. The cross dichroic prism 54 is provided with three end planes of incidence of light, and the colored light beams modulated by the liquid crystal panels 52R, 52G, and 52B enter the three end planes of incidence of light, respectively. The cross dichroic prism 54 reflects the R light beam and the B light beam modulated by the liquid crystal panels 52R, 52B, transmits the G light beam modulated by the liquid crystal panel 52G, and then combines the colored light beams with each other. In the cross dichroic prism 54, the end plane of incidence of light which the G1 light beam thus modulated enters faces to the optical axis direction-rear side L2, and the end planes of incidence of light which the R fight beam thus modulated and the B light beam thus modulated enter face to one side and the other side in the X direction, respectively.

Among the constituent components of the image light generation section 5, the incident side polarization plates 51 are disposed in the optical component housing 8, and are treated integrally with the illumination light guide optical system 4. As shown in FIG. 3 and FIG. 4, the incident side polarization plates 51 are respectively disposed on three surfaces, namely inner surfaces on one side and the other side in the X direction of the recessed part 81, and an inner surface on the optical axis direction-rear side L2, one for one. Meanwhile, among the constituent components of the image light generation section 5, the liquid crystal panels 52 and the emission side polarization plates 53 are attached to the cross dichroic prism 54 via a frame 55, and a support member 56 is attached to the cross dichroic prism 54 as shown in FIG. 2 and FIG. 3. The liquid crystal panels 52, the emission side polarization plates 53, the frame 55, the cross dichroic prism 54, and the support member 56 constitute a light modulating/combining optical system 50 separated from the illumination light guide optical system 4.

The light modulating/combining optical system 50 is fixed to the end part on the optical axis direction-rear side L2 of the projection optical system 6. In the case in which the projection optical system. 6 and the illumination light guide optical system 4 are connected to each other via the holding member 7, the light modulating/combining optical system 50 is disposed in the recessed section 81 of the optical component housing 8. As shown in FIG. 3, the support member 56 is provided with an arm part 561 fixed to an end surface on a lower side Z2 of the cross dichroic prism 54, and a ring-like part 562 connected to an end part on the optical axis direction-front side L1 of the arm part 561. The ring-like part 562 is provided with a front side end surface 563 perpendicular to the optical axis direction L. The front side end surface 563 has contact with a second fixation section 64 disposed in the end part on the optical axis direction-rear side L2 of the projection optical system 6 from the optical axis direction-rear side L2 when fixing the light modulating/combining optical system 50 to the projection optical system 6, and thus, the ring-like part 562 is fixed.

Projection Optical System

As shown in FIG. 1, the projection optical system 6 is provided with a front side lens 61 located on the light path posterior most stage side of the plurality of lenses, a lens barrel 62, and the plurality of lenses (not shown) disposed in the lens barrel 62. In FIG. 2 through FIG. 4, among the constituents of the projection optical system 6, the lens barrel 62 alone is illustrated. The front side lens 61 is held by a lens frame not shown fixed to the end part on the optical axis direction-front side L1 of the lens barrel 62, and disposed in the projecting opening part of the exterior housing 2. Further, to a part rather closer to the optical axis direction-front side L1 of the lens barrel 62, there is attached a focusing ring (not shown) on the outer circumferential side. The focusing ring is used for displacing the lenses located inside the lens barrel 62 in the optical axis direction L. The front side lens 61 is larger in external dimension viewed from the optical axis direction L than the lens barrel 62. Further, the front side lens 61 has a shape obtained by cutting an edge on the lower side Z2, and the light entering the projection optical system 6 is emitted from the front side lens 61 toward the upper side Z1.

As shown in FIG. 3 and FIG. 4, a position closer to the end part on the optical axis direction-front side L1 than the center in the optical axis direction L the lens barrel 62, there is formed a first fixation section 63 protruding outward in the radial direction. The first fixation section 63 is a first flange part having a rectangular shape viewed from the optical axis direction L. A surface on the optical axis direction-rear side L2 of the first fixation section 63 is a fixation surface perpendicular to the optical axis direction L. The holding member 7 has contact with the first fixation section 63 from the optical axis direction-rear side L2, and is fixed. The first fixation section 63 is provided with fixation through holes 631 formed on the our corners, and at the same time, is provided with positioning holes 633 formed at rough center of the edges on the both sides in the X direction. Positioning between the first fixation section 63 and the holding member 7 is achieved by the positioning holes 633 in the two places, and the fixation between the first fixation section 63 and the holding member 7 is achieved by fixation screws 632 inserted through the fixation through holes 631 located at the four places and screwed into the holding member 7. When fixing the holding member 7 to the first fixation section 63, the projection optical system 6 is supported by the holding member 7.

Further, the end part on the optical axis direction-rear side L2 of the lens barrel 62 is provided with the second fixation section 64. The second fixation section 64 is a second flange part having a ring-like shape viewed from the optical axis direction L. The lens barrel 62 is provided with a large-diameter part 621 provided with the first fixation section 63, and the large-diameter part 621 extends from the end part on the optical axis direction-front side L1 of the lens barrel 62 to a position on the optical axis direction-rear side L2 of the first fixation section 63. Further, the lens barrel 62 is provided with a first small-diameter part 622 smaller in diameter than the large-diameter part 621 formed on the optical axis direction-rear side L2 of the large-diameter part 621, and is provided with the second fixation section 64 having the ring-like shape and protruding outward in the radial direction formed on the optical axis direction-rear side L2 of the first small-diameter part 622. Further, on the optical axis direction-rear side L2 of the second fixation section. 64, there is formed a second small-diameter part 623 smaller in diameter than the first small-diameter part 622. Therefore, the second fixation section 64 is provided with a fixation surface 641 having a ring-like shape facing to the optical axis direction-rear side L2. The fixation surface 641 is a surface perpendicular to the optical axis direction L. The fixation surface 641 is provided with fixation holes 642 at three places located at intervals in the circumferential direction.

The front side end surface 563 of the ring-like part 562 provided to the support member 56 of the light modulating/combining optical system 50 has contact with the second fixation section 64 from the optical axis direction-rear side L2, and is fixed. The ring-like part 562 is provided with fixation through holes 564 formed at three places located at intervals in the circumferential direction, and the second fixation section 64 is provided with fixation holes 642 formed at three places corresponding respectively to the fixation through holes 564. Fixation between the second fixation section 64 and the light modulating/combining optical system 50 is achieved by fixation screws 565 inserted through the fixation through holes 564 of the ring-like part 562 and screwed into t second fixation section 64. When fixing the light modulating/combining optical system 50 to the second fixation section 64, the light modulating/combining optical system 50 is supported by the lens barrel 62.

As described above, in the present embodiment, the first fixation section 63 and the second fixation section 64 are formed at the two places located at a distance in the optical axis direction L in the lens barrel 62. Further, the holding member 7 has contact with the first fixation section 63 from the optical axis direction-rear side L2, and is fixed, and the optical component housing 8 has contact with the holding member 7 from the optical axis direction-rear side L2, and is fixed. Therefore, the lens barrel 62 is fixed to the optical component housing 3 via the holding member 7, and thus, the illumination light guide optical system 4 and the projection optical system 6 are integrally connected to each other via the holding member 7. In contrast, the light modulating/combining optical system 50 has contact with the second fixation section 64 from the optical axis direction-rear side L2, and is fixed. In other words, the light modulating/combining optical system 50 is directly fixed to the lens barrel 62 without the intervention of the holding member 7 for fixing the illumination light, guide optical system 4 to the lens barrel 62.

Holding Member

The holding member is a member having a predetermined length in the optical axis direction L. In the inside of the holding member 7, there is formed a lens barrel housing section 75 extending in the optical axis direction L. As shown an FIG. 3 and FIG. 4, the holding member 7 has a shape which surrounds the three sides, namely one side and the other side in the X direction and the lower side Z2 of the lens barrel housing section 75, but is cut out on the upper side Z1 The holding member 7 is provided with a lens barrel fixation section 71 disposed in an end part on the optical axis direction-front side L1, an illumination light guide optical system fixation section 72 disposed in an end part on the optical axis direction-rear side L2, and a connection section 73 for connecting the lens barrel fixation section 71 and the illumination light guide optical system fixation section 72 to each other. As shown in FIG. 3, in a central part in the optical axis direction L of the lens barrel housing part 75, there is disposed a cylindrical inner circumferential surface 751. Further, the lens barrel housing section 75 forms a space having a rectangular cross-section expanding toward the outer circumferential side from the cylindrical inner circumferential surface 751 in both end parts in the optical axis direction L in which the lens barrel fixation section 71 and the illumination light guide optical system fixation section 72 are respectively disposed.

As shown in FIG. 3, the lens barrel fixation section 71 is provided with front side contact sections facing to the optical axis direction-front side L1 respectively located on the both sides in the X direction of the lens barrel housing section 75, and each of the front side contact sections is provided with fixation holes 711 formed at two places at a distance in the Z direction. The lens barrel fixation section 71 is a region which has contact with the first fixation section 63 of the lens barrel 62 from the optical axis direction-rear side L2, and is fixed. To the fixation holes 711, the fixation screws 632 are respectively screwed from the side of the first fixation section 63 of the lens barrel 62.

As shown in FIG. 4, the illumination light guide optical system fixation section 72 is provided with rear side contact sections facing to the optical axis direction-rear side L2 respectively located on the both sides in the X direction of the lens barrel housing section 75, and each of the rear side contact sections is provided with fixation through holes 721 formed at two places at a distance in the Z direction. The fixation through holes 721 of the illumination light guide optical system fixation section 72 are formed so as to penetrate boss parts 722 formed so as to protrude toward the inside of the lens barrel housing section 75, and are arranged so that the fixation screws 723 can be screwed from the inside of the lens barrel housing section 5. The illumination light guide optical system fixation section 72 is a region which the wall parts 62 of the optical component housing 8 have contact with from the optical axis direction-rear side L2, and are fixed to. The fixation screws 723 are screwed into the respective fixation holes 821 provided to the wall parts 82, and are fixed.

The holding member 7 is provided with exterior housing fixation sections 74 respectively protruding on one side and the other side in the X direction from the outer side surface of the connection section 73. The exterior housing fixation sections 74 are each formed to have a plate-like shape perpendicular to the Z direction, and each extending in parallel to the optical axis direction L. The exterior housing fixation sections 74 are connected to the lens barrel fixation section 71 in the end parts on the optical axis direction-front side L1, and are connected to the illumination light guide optical system fixation section 72 in the end parts on the optical axis direction-rear side L2. The end parts on the optical axis direction-front side L1 of the exterior housing fixation sections 74 are each provided with a fixation through hole 741 through which a fixation screw to the exterior housing 2 is inserted. The holding member 7 is fixed to the exterior housing 2 via the fixation through holes 741 formed at two places on the both sides in the X direction. The fixation through holes 741 are disposed in the end part on the optical axis direction-front side L1 of the holding member 7, and therefore, the exterior housing fixation sections 74 are configured so as to fix the end part on the optical axis direction-front side L1 of the holding member 7 to the exterior housing 2. The exterior housing fixation sections 74 are connected to reinforcing ribs 76 protruding from the outer circumferential surface of the connection section 73 and extending in the circumferential direction. The holding member 7 is provided with the reinforcing ribs 76 which extend in the circumferential direction on the outer circumferential surface of the connection section 73, and are formed in the optical axis direction L at a constant pitch.

Fixation Structure of Light Modulating/Combining Optical System and Illumination Light Guide Optical System to Lens Barrel and Functions and Advantages Thereof.

Figure 5:
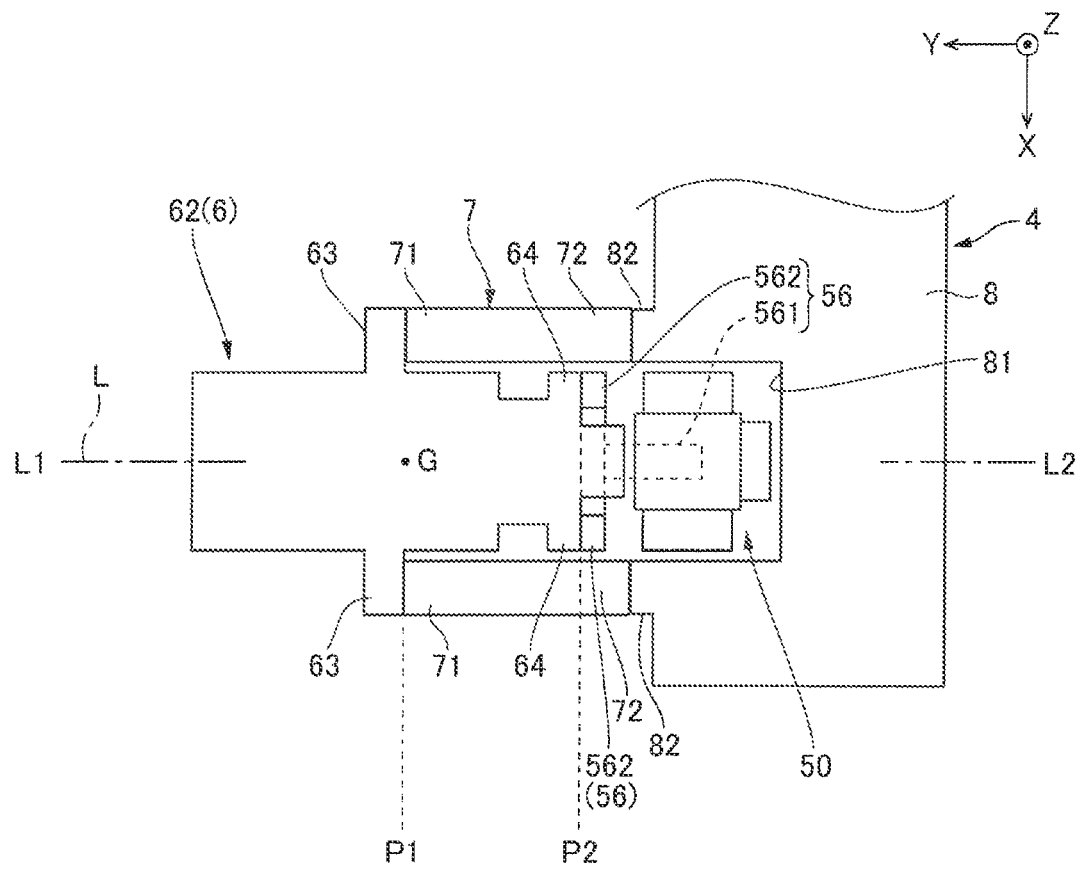
FIG. 5 is an explanatory diagram showing a fixation structure of a light modulating/combining optical system and an illumination light guide optical system with respect to a lens barrel.

FIG. 5 is an explanatory diagram showing a fixation structure of the light modulating/combining optical system 50 and the illumination light guide optical system 4 with respect to the lens barrel 62. As already described, in the present embodiment, the lens barrel 62 is provided with the fixation sections at the two places, namely the first fixation section 63 and the second fixation section 64, the holding member 7 is fixed to the first fixation section 63 from the optical axis direction-rear side L2, and the optical component housing 8 as the housing of the illumination light guide optical system 4 is fixed to the holding member 7 from the optical axis direction-rear side L2. In contrast, the support member 56 as a constituent component of the light modulating/combining optical system 50 is fixed to the second fixation section 64 from the optical axis direction-rear side L2.

In the present embodiment, the first fixation section 63 is disposed at a position closer to the end part on the optical axis direction-front side L1 than to the end part on the optical axis direction-rear side L2 of the lens barrel 62, and a fixation position P1 of the holding member 7 with respect to the lens barrel 62 is located closer to the end part on the optical axis direction-front side L1 than to the end part on the optical axis direction-rear side L2 of the lens barrel 62. Here, since the projection optical system 6 is provided with the front side lens 61 large in size disposed in the end part on the optical axis direction-front side L1 of the lens barrel 62, the centroid G of the projection optical system 6 is located closer to the end part on the optical axis direction-front side L1 than to the center in the optical axis direction L of the lens barrel 62. In the present embodiment, the position in the optical axis direction L of the first fixation section 63 is set so that the centroid G of the projection optical system 6 and the fixation position P1 are disposed at the same position in the optical axis direction L.

It should be noted that the fixation position P1 is not required to coincide with the centroid G, but is only required to be a position closer to the end part on the optical axis direction-front side L1 than to the end part on the optical axis direction-rear side L2 of the lens barrel 62. According to such a position, the centroid G of the projection optical system 6 and the fixation position P1 are located close to each other in the optical axis direction L. By setting the fixation position P1 to a position coinciding with the centroid G or a position close to the centroid G, the projection optical system 6 is supported by the holding member 7 at the centroid G or a position close to the centroid G. Therefore, since the rotational moment applied to the projection optical system 6 is small, it is possible to prevent the deformation of the members and the deterioration of the position accuracy between the members, and it is possible to stably support the projection optical system 6. Further, by supporting the projection optical system 6 at a position close to the centroid G, the position shift and the deformation of the projection optical system 6 due to an impact can be prevented.

The holding member 7 of the present embodiment is provided with the exterior housing fixation members 74 for the fixation to the exterior housing 2 of the projector 1. Further, the exterior housing fixation sections 74 extend to the end part on the optical axis direction-front side L1 of the holding member 7, and the fixation through holes 741 are disposed in the end parts on the optical axis direction-front side L1 of the respective exterior housing fixation sections 74. Therefore, the end part of the holding member 7 on the side to which the lens barrel 62 is fixed can be fixed to the exterior housing 2, and thus, the holding member 7 can be fixed to the exterior housing 2 at a position closer to the projection optical system 6. Therefore, in the case of using the projection optical system 6 heavy in weight, it is possible to support the projection optical system 6 in a balanced manner.

Further, in the present embodiment, the end part on the optical axis direction-rear side L2 of the lens barrel 62 is provided with the second fixation section 64. Therefore, the fixation position P2 of the light modulating/combining optical system 50 with respect to the second fixation section 64 is located in the end part on the optical axis direction-rear side L2 of the lens barrel 62. Therefore, since the distance in the optical axis direction L between the light modulating/combining optical system 50 disposed on the light axis direction-rear side L2 of the lens barrel 62 and the second fixation section 64 is short, the dimension in the optical axis direction L of the member on the light modulating/combining optical system 50 side fixed to the second fixation section 64 is short. In the present embodiment, the ring-like part 562 of the support member 56 to which the cross dichroic prism 54 is fixed is fixed to the second fixation section 64, but the dimension in the optical axis direction L of the support member 56 is short. Therefore, the possibility that the position accuracy of the cross dichroic prism 54 is deteriorated by the thermal expansion of the support member 56 is low. Therefore, it is possible to prevent the degradation of the temperature drift characteristics to prevent the focusing shift.

In the present embodiment, the second fixation section 64 for fixing the light modulating/combining optical system 50 to the lens barrel 62 is provided separately from the first fixation section 63 for fixing the illumination light guide optical system 4 and the holding member 7. Therefore, the light modulating/combining optical system 50 is not affected by the position shift and the deformation of the holding member 7 due the fixation of the illumination light guide optical system 4. Further, the light modulating/combining optical system 50 is not affected by the position shift and the deformation of the holding member 7 due to an impact such as dropping. Therefore, the possibility that the position accuracy of the light modulating/combining optical system 50 is deteriorated is low. Further, the light modulating/combining optical system 50 is directly fixed to the second fixation section 64 provided to the lens barrel 62, and no other member intervenes between the light modulating/combining optical system 50 and the lens barrel 62. Therefore, it is possible to prevent the deterioration of the position accuracy of the light modulating/combining optical system 50 due to an impact or the like.

Further, the first fixation section 63 and the second fixation section 64 are disposed at different positions in the direction parallel to the optical axis of the projection optical system 6. In other words, as described above, the second fixation section 64 is disposed in the end part on the optical axis direction-rear side L2 of the lens barrel 62, and the first fixation section 63 is disposed at a position closer to the end part on the optical axis direction-front side L1 than to the end part on the optical axis direction-rear side L2 of the lens barrel 62. Thus, the light modulating/combining optical system 50 the deterioration in position accuracy of which should be prevented, and the illumination light guide optical system 4 heavy in weight can each be fixed at an appropriate position with respect to the lens barrel 62. It should be noted that the first fixation section 63 and the second fixation section 64 are not limited to such a positional relationship as in the present embodiment. Further, the first fixation section 63 and the second fixation section 64 can be different in positions in a direction parallel to the optical axis of the projection optical system 6 from those of the present embodiment.

In the present embodiment, since the lens barrel fixation section 71 of the holding member 7 has contact with the first fixation section 63 from the optical axis direction-rear side L2, and is fixed, it is possible to position the holding member 7 in the optical axis direction L and then fix the holding member 7. Further, since the optical component housing 8 has contact with the holding member 7 from the optical axis direction-rear side L2, and then fixed, it is possible to position the illumination light guide optical system 4 in the optical direction L and then fix the illumination light guide optical system via the holding member 7. Further, the ring-like part 562 of the light modulating/combining optical system 50 has contact with the second fixation section 64 from the optical axis direction-rear side L2, and is fixed. Therefore, it is possible to achieve the positioning in the optical axis direction L of the light modulating/combining optical system 50.

MODIFIED EXAMPLES

Figure 6:
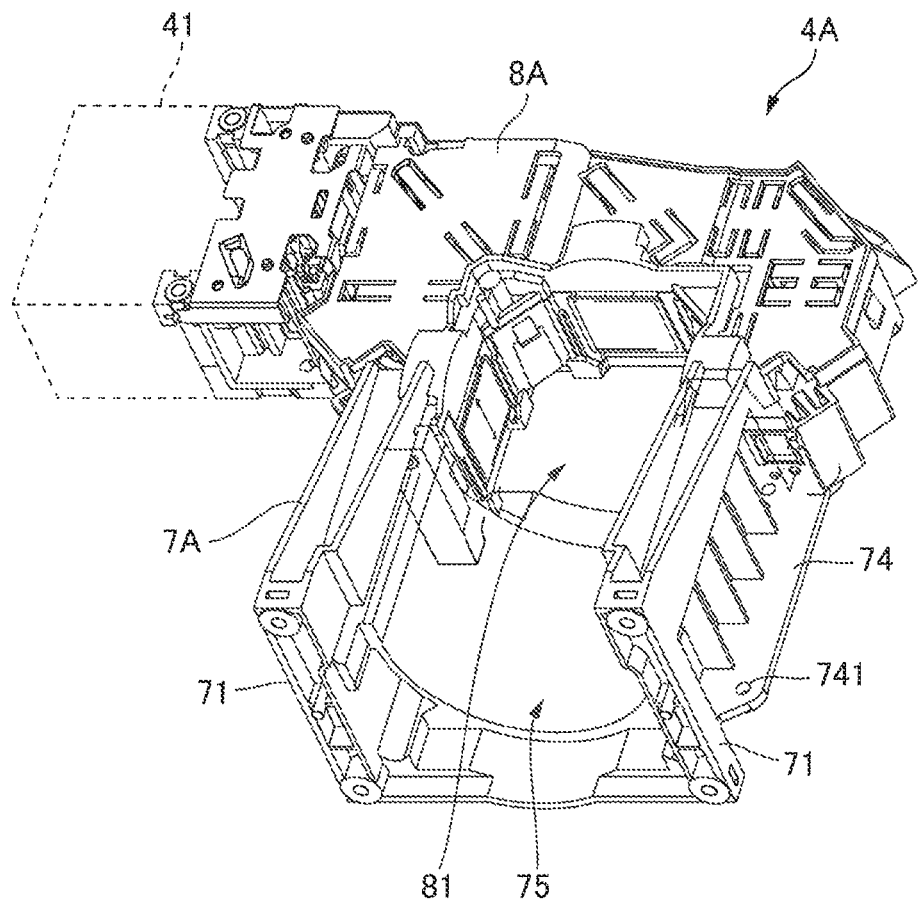
FIG. 6 is a perspective view of an optical component holding member of a modified example.

FIG. 6 is a perspective view of an illumination light guide optical system 4A of a modified example. The illumination light guide optical system 4A of the modified example is a device in which the optical component housing 8A and the holding member 7 of the embodiment described above are made to be a single member. Specifically, the optical component housing 8A of the illumination light guide optical system 4A is provided with a holding member forming section 7A, the holding member forming section 7A is provided with the lens barrel housing section and the recessed part 81 is formed on the optical axis direction-rear side L2 of the lens barrel housing section 75. The end part on the optical axis direction-front side L1 of the holding member forming section 7A is provided with the lens barrel fixation section 71. Further, the holding member forming section 7A is provided with the exterior housing fixation sections 74 and the fixation through holes 741. Therefore, by making the lens barrel fixation section 71 have contact with the first fixation section 63 of the embodiment described above from the optical axis direction-rear side L2 to be fixed, it is possible to fix the illumination light guide optical system. 4A to the first fixation section 63. Also in such a configuration as described above, the same functions and advantages as in the embodiment described above can be obtained.

The entire disclosure of Japanese Patent Application No. 2017-160897, filed on Aug. 24, 2017 is expressly incorporated by reference herein.

What is claimed is:

1. A projector comprising:
an illumination light guide optical system provided with a light source, an optical system, and an optical component housing adapted to hold the light source and the optical system;
a light modulating/combining optical system adapted to modulate light entering the light modulating/combining optical system from the illumination light guide optical system to generate image light beam;
a projection optical system adapted to project the image light entering the projection optical system from the light modulating/combining optical system;
a holding member to which the optical component housing is fixed; and
an exterior housing adapted to house the illumination light guide optical system, the light modulating/combining optical system, the projection optical system, and the holding member, wherein:
the projection optical system is provided with a lens and a lens barrel adapted to hold the lens,
the lens barrel is provided with a first fixation section to which the holding member is fixed, and a second fixation section to which the light modulating/combining optical system is fixed, the first fixation section and the second fixation section being disposed at different positions,
the second fixation portion and the light modulating/combining optical system both contact each other and are immovably fixed to each other,
the light modulating/combining optical system comprises a supporting member having a ring part,
the second fixation portion is fixed to the ring part, and
a dimension of the ring part in an optical axis direction of the lens barrel is shorter than a dimension in the optical axis direction of the second fixation portion.

2. The projector according to claim 1, wherein
the first fixation section is a first flange protruding outward in a radial direction from the lens barrel, and
the holding member is provided with a lens barrel fixation section which has contact with the first flange from an optical axis direction-rear side, and is fixed to the first flange, an illumination light guide optical system fixation section to which the optical component housing is fixed, and an exterior housing fixation section to be fixed to the exterior housing.

3. The projector according to claim 1, wherein
the first fixation section and the second fixation section are disposed at respective positions different in a direction parallel to an optical axis of the projection optical system from each other.

4. The projector according to claim 1, wherein
the second fixation section is disposed in an end part on the optical axis direction-rear side of the lens barrel.

5. The projector according to claim 4, wherein
the first fixation section is disposed at a position closer to an end part on the optical axis direction-front side than to an end part on the optical axis direction-rear side of the lens barrel.

6. The projector according to claim 1, wherein
in a direction parallel to an optical axis of the projection optical system, a position of the first fixation section coincides with a centroid of the projection optical system.

7. The projector according to claim 1, wherein
the first fixation section and the holding member both contact each other and are fixed to each other.

8. A projector comprising:
an illumination light guide optical system provided with a light source, an optical system, and an optical component housing adapted to hold the light source and the optical system;
a light modulating/combining optical system adapted to modulate light entering the light modulating/combining optical system from the illumination light guide optical system to generate image light beam;
a projection optical system adapted to project the image light entering the projection optical system from the light modulating/combining optical system; and
an exterior housing adapted to house the illumination light guide optical system, the light modulating/combining optical system, and the projection optical system, wherein:
the projection optical system is provided with a lens and a lens barrel adapted to hold the lens,
the lens barrel is provided with a first fixation section to which the optical component housing is fixed, and a second fixation section to which the light modulating/combining optical system is fixed, the first fixation section and the second fixation section being disposed at different positions,
the second fixation portion and the light modulating/combining optical system both contact each other and are immovably fixed to each other,
the light modulating/combining optical system comprises a supporting member having a ring part,
the second fixation portion is fixed to the ring part, and
a dimension of the ring part in an optical axis direction of the lens band is shorter than a dimension in the optical axis direction of the second fixation portion.

9. The projector according to claim 8, wherein
the first fixation section is a first flange protruding outward in a radial direction from the lens barrel, and
the optical component housing is provided with a lens barrel fixation section which has contact with the first flange from an optical axis direction-rear side, and is fixed to the first flange, and an exterior housing fixation section to be fixed to the exterior housing.

10. The projector according to claim 8, wherein
the first fixation section and the second fixation section are disposed at respective positions different in a direction parallel to an optical axis of the projection optical system from each other.

11. The projector according to claim 8, wherein
the second fixation section is disposed in an end part on the optical axis direction-rear side of the lens barrel.

12. The projector according to claim 11, wherein
the first fixation section is disposed at a position closer to an end part on the optical axis direction-front side than to an end part on the optical axis direction-rear side of the lens barrel.

13. The projector according to claim 8, wherein
in a direction parallel to an optical axis of the projection optical system, a position of the first fixation section coincides with a centroid of the projection optical system.

14. The projector according to claim 8, wherein
the first fixation section and the holding member both contact each other and are fixed to each other.

\* \* \* \* \*